(12) United States Patent
Lean et al.

(10) Patent No.: US 6,404,536 B1
(45) Date of Patent: Jun. 11, 2002

(54) POLARIZATION INDEPENDENT TUNABLE ACOUSTO-OPTICAL FILTER AND THE METHOD OF THE SAME

(75) Inventors: Eric Gung-Hwa Lean; Chen-Bin Huang; Wei-Jen Chou, all of Hsinchu; Shu-Mei Yang, Taichung Hsien; Chieh Hu, Taichung, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/800,474

(22) Filed: Mar. 8, 2001

(30) Foreign Application Priority Data

Dec. 30, 2000 (TW) ........................ 89128374 A

(51) Int. Cl.[7] ............................ G02F 1/33; G02B 27/28
(52) U.S. Cl. ...................... 359/308; 359/285; 359/306; 359/122; 359/484
(58) Field of Search ................................ 359/285–287, 359/301–314, 484, 117, 122, 124

(56) References Cited

U.S. PATENT DOCUMENTS

| | | | |
|---|---|---|---|
| 5,329,397 A | 7/1994 | Chang | 359/308 |
| 5,359,451 A | 10/1994 | Gelbart et al. | 359/285 |
| 5,410,371 A | 4/1995 | Lambert | 348/769 |
| 5,909,304 A | 6/1999 | Chang | 359/308 |
| 5,912,748 A * | 6/1999 | Wu et al. | 359/117 |
| 5,946,128 A | 8/1999 | Paek | 359/305 |
| 5,978,125 A * | 11/1999 | Yao | 359/245 |
| 6,005,697 A * | 12/1999 | Wu et al. | 359/117 |
| 6,016,216 A | 1/2000 | Chang | 359/285 |
| 6,097,518 A * | 8/2000 | Wu et al. | 359/122 |
| 6,175,432 B1 * | 1/2001 | Wu et al. | 359/122 |
| 6,208,442 B1 * | 3/2001 | Liu et al. | 359/122 |
| 6,339,492 B1 * | 1/2002 | Terahara et al. | 359/280 |
| 6,360,037 B1 * | 3/2002 | Riza | 359/128 |

* cited by examiner

*Primary Examiner*—Evelyn A Lester
(74) *Attorney, Agent, or Firm*—Rabin & Berdo, P.C.

(57) ABSTRACT

The present invention pertains to a polarization independent tunable acousto-optical filter and the corresponding method. The filter diffracts an input light beam into a first input light beam unaffected by acoustic waves and a second input light beam affected by acoustic waves. A polarization beam displacer/combiner is employed to separate the input light beam into two orthogonal beams. Several polarized rotators are used to rotate the polarization of light by 90 degrees. An acousto-optical device makes the polarization of light with a particular wavelength rotate by 90 degrees. The two beams are then properly combined to form orthogonal beams. The filtering method has nothing to do with the polarization of the incident light. The filter has such advantages as a high extinction ratio, a small volume and a lower cost.

24 Claims, 3 Drawing Sheets

POLARIZATION INDEPENDENT TUNABLE ACOUSTO-OPTICAL FILTER AND THE METHOD OF THE SAME

BACKGROUND OF THE INVENTION

1. Field of Invention

The present invention relates to a polarization independent tunable acousto-optical filter and the corresponding method. More specifically. it relates to a polarization independent tunable acousto-optical filter that can be applied to dense wavelength-division multiplexing (DWDM) systems and the method of the same.

2. Related Art

When an acoustic wave passes through a medium, the structure in the medium will generate a periodic elastic deformation so that its refraction index also has a periodic variation. This is equivalent to a moving phase grating that can diffract incident light. This phenomenon is called the acousto-optical effect.

An acousto-optical tunable filter (AOTF) is a device utilizing the acousto-optical effect. When input light contains many distinctive channels at different wavelengths, these channels can be individually extracted through diffraction by changing the modulation frequency of an external RF generator. Since the central wavelength of the interacting light can be adjusted by the external RF frequency and existence of multiple interacting bands is allowed, therefore the tunable acousto-optical filter can be useful when applied to dense wavelength-division multiplexing (DWDM) systems.

As a key element in a DWDM system, the tunable acousto-optical filter has to have such properties as high resolution, high side-lobe suppression ratio, and polarization independence. The high resolution condition means that one can precisely define a specific frequency band for light to be diffracted. The high side-lobe suppression means that only a specific band is filtered, leaving light with other frequencies intact. The polarization independence means that the filtering effect is independent of the polarization of the input light. The prior art, as disclosed in the U.S. Pat. Nos. 5,329,397, 535,945,1, 5,410,371, 5,946,128, and 5,909,304 cannot simultaneously satisfy the above three requirements.

Tunable acousto-optical filters can be categorized as collinear and non-collinear types. The non-collinear type refers to the propagation of optical waves and acoustic waves along different axes. The U.S. Pat. No. 6,016,216 proposed a non-collinear polarization independent tunable acousto-optical filter that can satisfy the above-mentioned three requirements. However, the polarization beam splitter (PBS) used in the method disclosed therein is expensive and the propagation of the light is not along a single axis. Therefore, it has a big volume and a low extinction ratio. Since the separating distance between beams is too big, two transducers are needed and the necessary microwave energy is severely high.

In view of the foregoing, how to provide a tunable acousto-optical filter that can simultaneously satisfy the requirements of high resolution, high side-lobe suppression, polarization independence, minimized volume, and low cost are important subjects to be studied.

SUMMARY OF THE INVENTION

Therefore, the present invention provides a polarization independent tunable acousto-optical filter and the method of the same. The filter transmits an input light beam into a first output light beam unaffected by acoustic waves and diffracts a second output light beam being affected by acoustic waves.

The disclosed invention uses a first polarization beam displacer/combiner to separate the input light beam into a first polarized light beam and a second polarized light beam orthogonal to each other. A first polarization rotator rotates the polarization of the first polarized light beam by 90 degrees. An acousto-optical device generates the acousto-optical effect to rotate the polarization of the light of a particular wavelength by 90 degrees. A second polarization beam displacer/combiner separates a third polarized light beam from the first polarized light beam and a fourth polarized light beam from the second polarized light beam. A second polarization rotator rotates the polarizations of the second and the fourth polarized light beams by 90 degrees. A third polarization rotator rotates the polarizations of the third and the fourth polarized light beams by 90 degrees. A third polarization beam displacer/combiner combines the first polarized light beam and the second polarized light beam into a first output light beam that is unaffected by acoustic waves and combines the third polarized light beam and the fourth polarized light beam into a second output light beam that has a specific wavelength diffracted by the acoustic wave.

It is thus an object of the present invention to provide a tunable acousto-optical filter and the corresponding method that satisfy such requirements as high resolution, high side-lobe suppression, and polarization independence, and can minimize its volume and lower its cost.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
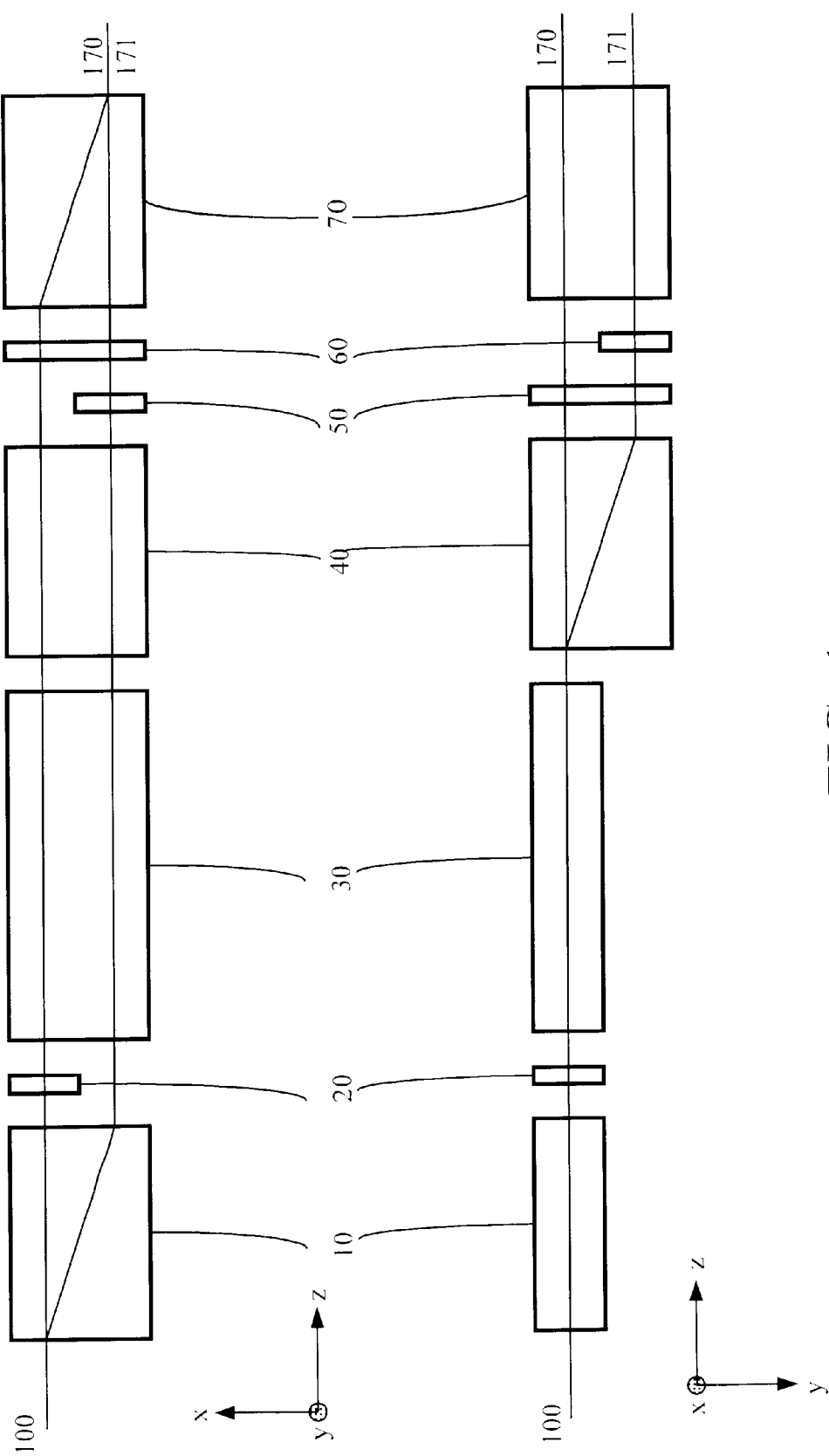
FIG. 1 shows optical paths in a polarization independent tunable acousto-optical filter in the x-y plane and the y-z plane.

As shown in FIG. 1, the present specification discloses a polarization independent tunable acousto-optical filter, which transmits an input light beam into a first output light beam that is unaffected by acoustic waves and a second output light beam that is diffracted by acoustic waves. The tunable filter contains a first polarization beam displacer/combiner 10, a first polarization rotator 20, an acousto-optical (AO) device 30, a second polarization beam displacer/combiner 40, a second polarization rotator 50, a third polarization rotator 60, and a third polarization beam displacer/combiner 70.

The first polarization beam displacer/combiner 10 separate input light 100 into a first polarized light beam and a second polarized light beam orthogonal to each other. The first polarization beam displacer/combiner 10 can be a birefringent crystal.

The first polarization rotator 20 rotates the polarization direction of the first polarized light beam output from the first polarization beam displacer/combiner by 90 degrees.

The first polarization rotator 20 can be a half-wave plate or a Faraday rotator.

The AO device 30 receives the two output beams after the first polarization rotator 20 both in the same polarization and produce the AO effect to rotate the polarization of light of a specific wavelength by 90 degrees. The AO device 30 can be an AO crystal, e.g., $TeO_2$.

The second polarization beam displacer/combiner 40 receives the two polarization mixed light beam outputs from the AO device 30. Through a proper optical axis design in the second polarization beam displacer/combiner 40, the wavelength-specific diffracted light beam whose polarization is rotated by 90 degrees owing to the AO effect, is separated from light beam one and light beam two into a third polarized light beam and a fourth polarized light beam, respectively. The second polarization beam displacer/combiner 40 can be a birefringent crystal.

The second polarization rotator 50 rotates the polarizations of the second polarized light beam and the fourth polarized light beam Output from the second polarization beam displacer/combiner 50 by 90 degrees. The second polarization rotator 50 can be a hall-wave plate or a Faraday crystal. To make this invention polarization mode dispersion (PMD) free, a third polarization rotator 60 rotates the polarizations of the third polarized light beam and the fourth polarized light beam output from the second polarization rotator 50 by 90 degrees. The third polarization rotator 60 can be a half-wave plate or a Faraday crystal.

The third polarization beam displacer/combiner 70 combines the first polarized light beam and the second polarized light beam into a first output light beam 170 and combines the third polarized light beam and the fourth polarized light beam into a second output light beam 171 that has a specific wavelength and is diffracted by acoustic waves, often referred as the $1^{st}$ order light beam. The third polarization beam displacer/combiner 70 can be a birefringent crystal.

Figure 2:
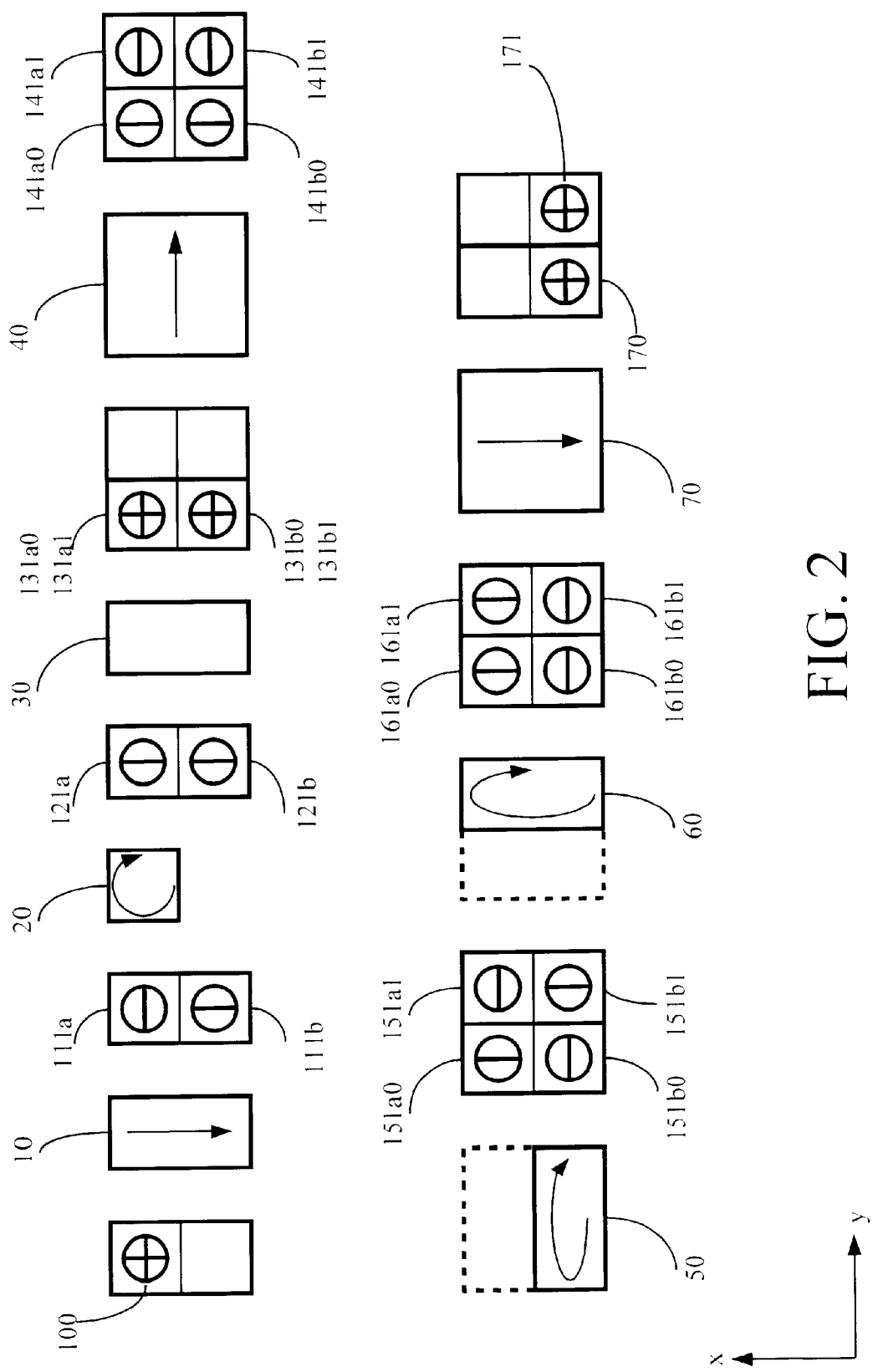
FIG. 2 shows a polarization relation diagram of a polarization independent tunable acousto-optical filter in the x-y plane.

With reference to FIG. 2, after an input light beam 100 enters the first polarization beam displacer/combiner 10, the component whose polarization is perpendicular to the optical axis directly passes through to form a first polarized light beam 111*a*. The first polarized light beam is an ordinary ray (O-ray). The component whose polarization is parallel to the optical axis is separated into a second polarized light beam 111*b* due to the walk-off phenomenon. The second polarized light beam 111*b* is an extraordinary ray (E-ray), which obtains a displacement in the x direction. When the first polarized light beam 111*a* passes through the first polarization rotator 20, its polarization is rotated by 90 degrees so that both the first polarized light beam 121*a* and the second polarized light beam 121*b* are O-rays in reference to the AO device 30. Through the AO effect and phase matching condition, the first polarized light beam contains a zero order component 131*a*0 and a first order component 131*a*1, while the second polarized light beam contains a zero order component 131*b*0 and a first order component 131*b*1. The polarizations of the zero order and first order components are orthogonal to each other, that is, they differ by 90 degrees. After the first polarized light beam passes through the second polarization beam displacer/combiner 40, the polarization of the component which is an E-ray to the second polarization beam displacer/combiner 40 is separated into a third polarized light beam 141*a*1. After the second polarized light beam passes through the second polarization beam displacer/combiner 40, the polarization of the component which is an E-ray to the second polarization beam displacer/combiner 40 is separated into a fourth polarized light beam 141*b*1.

At the moment, the first polarized light beam 141*a*0 and the second polarized light beam 141*b*0 are both zero order and the third polarized light beam 141*a*1 and the fourth polarized light beam 141*b*1 are both first order. The second polarization rotator 50 rotates the second polarized light beam 141*b*0 and the fourth polarized light beam 141*b*1 by 90 degrees. The third polarization rotator 60 rotates the third polarized light beam 151*a*1 and the fourth polarized light beam 15*b*1 by 90 degrees. The third polarization beam displacer/combiner 70 combines the first polarized light beam 161*a*0 and the second polarized light beam 161*b*0 that are both zero order components into a first output light beam 170. The third polarization beam displacer/combiner 70 combines the third polarized light beam 161*a*1 and the fourth polarized light beam 161*b*1 that are both first order components into a second output light beam 171. Since the first output light beam is purely composed of zero order components, they are not affected by acoustic waves. The second output light beam 171 is purely composed of first order components. They are light of a specific wavelength that went under interaction with acoustic waves.

Figure 3:
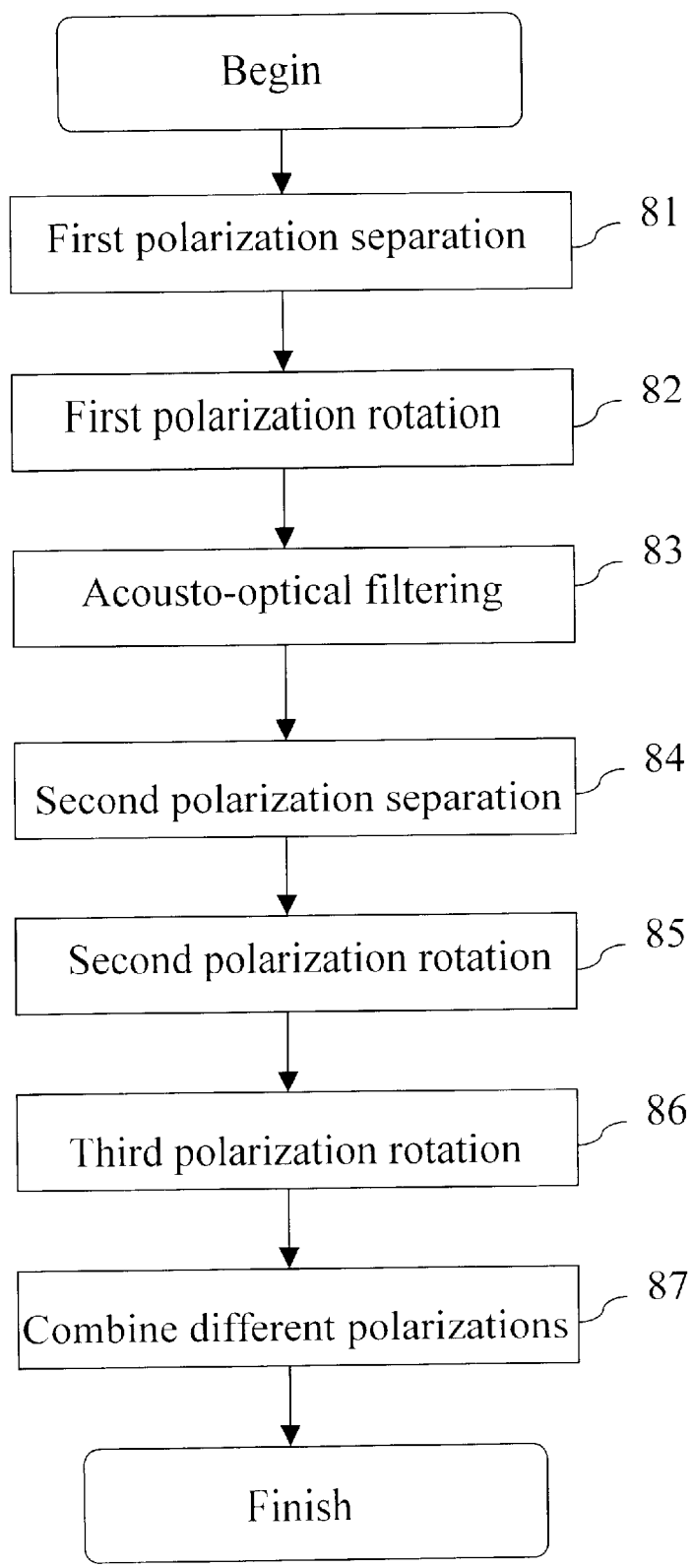
FIG. 3 is a flow chart of the independent tunable acousto-optical filtering method disclosed herein.

With reference to FIG. 3, the disclosed polarization independent tunable acousto-optical (AO) filtering method that diffracts an input light beam into a first output light beam unaffected by acoustic waves and a second output light beam affected by acoustic waves is illustrated. The method include the steps of first polarization separation 81, first polarization rotation 82, AO filtering 83, second polarization separation 84, second polarization rotation 85, third polarization rotation 86, and polarization combination 87.

The step of first polarization separation 81 separates an input light beam into a first polarized light beam and a second polarized light beam. This step can be accomplished using a birefringent crystal. The step of first polarization rotation 82 rotates the polarization of the first polarized light beam by 90 degrees. This step can be accomplished using a halt-wave plate or a Faraday crystal. The step of AO filtering 83 generates the AO effect to rotate the polarization of light with a specific wavelength by 90 degrees. This step can be accomplished using an AO crystal, such as $TeO_2$. The step of second polarization separation 84 separates a third polarized light beam from the first polarized light beam and a fourth polarized light beam from the second polarized light beam. This step can be accomplished using a birefringent crystal. The step of second polarization rotation 85 rotates the polarizations of the second polarized light beam and the fourth polarized light beam by 90 degrees. This step can be accomplished using a half-wave plate or a Faraday crystal. The step of third polarization rotation 86 rotates the polarizations of the third polarized light beam and the fourth polarized light beam by 90 degrees. This step can be accomplished using a half-wave plate or a Faraday crystal. The step of polarization combination 87 combines the first polarized light beam and the second polarized light beam into the first output light beam and combines the third polarized light beam and the fourth polarized light beam into the second output light beam. This step can be accomplished using a birefringent crystal.

EFFECTS OF THE INVENTION

The present invention discloses a polarization independent tunable AO filter and the corresponding method. They satisfy the requirements of high resolution, high side-lobe suppression, and polarization independence for AO tunable filtering. Since using birefringent crystals can lower the cost, achieve a higher extinction ratio, and the input and output of light are truly linear. Therefore, the volume of the products can be greatly minimized. So the products made using the present invention have the advantages of high resolution, high side-lobe suppression, polarization independence, high extinction ratios, small volumes and lower prices.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A polarization independent tunable acousto-optical (AO) filter to transmit an input light beam into a first output light beam unaffected by acoustic waves and a second output light beam diffracted by acoustic waves, which filter comprises:
   a first polarization beam displacer/combiner to separate the input light beam into a first polarized light beam and a second polarized light beam orthogonal to each other;
   a first polarization rotator to rotate the polarization of the first polarized light beam output from the first polarization beam displacer/combiner by 90 degrees;
   an AO device to receive the first polarized light beam and the second polarized light beam output from the first polarization rotator and to generate an AO effect that rotates light of a specific wavelength by 90 degrees;
   a second polarization beam displacer/combiner to receive the first polarized light beam and the second polarized light beam output from the AO device and separate a third polarized light beam from the first polarized light beam and a fourth polarized light beam from the second polarized light beam;
   a second polarization rotator to rotate the polarization of the second polarized light beam and the fourth polarized light beam output from the second polarization beam displacer/combiner by 90 degrees;
   a third polarization rotator to rotate the polarization of the third polarized light beam and the fourth polarized light beam output from the second polarization rotator by 90 degrees; and
   a third polarization beam displacer/combiner to combine the first polarized light beam and the second polarized light beam into the first output light beam and the third polarized light beam and the fourth polarized light beam into the second output light beam.

2. The filter of claim 1, wherein the first polarization beam displacer/combiner is a birefringent crystal.

3. The filter of claim 1, wherein the first polarization rotator is a half-wave plate.

4. The filter of claim 1, wherein the first polarization rotator is a Faraday crystal.

5. The filter of claim 1, wherein the AO device is an AO crystal.

6. The filter of claim 5, wherein the AO device is a $TeO_2$, crystal.

7. The filter of claim 1, wherein the second polarization beam displacer/combiner is a birefringent crystal.

8. The filter of claim 1, wherein the second polarization rotator is a half-wave plate.

9. The filter of claim 1, wherein the second polarization rotator is a Faraday crystal.

10. The filter of claim 1, wherein the third polarization rotator is a half-wave plate.

11. The filter of claim 1, wherein the third polarization rotator is a Faraday crystal.

12. The filter of claim 1, wherein the third polarization beam displacer/combiner is a birefringent crystal.

13. A polarization independent tunable acousto-optical (AO) filtering method to diffract an input light beam into a first output light beam unaffected by acoustic waves and a second output light beam affected by acoustic waves, which method comprises the steps of:
   a step of first polarization separation, which separates an input light beam into a first polarized light beam and a second polarized light beam;
   a step of first polarization rotation, which rotates the polarization of the first polarized light beam by 90 degrees;
   a step of AO filtering, which generates an AO effect to rotate the polarization of light with a specific wavelength by 90 degrees;
   a step of second polarization separation, which separates a third polarized light beam from the first polarized light beam and a fourth polarized light beam from the second polarized light beam;
   a step of second polarization rotation, which rotates the polarizations of the second polarized light beam and the fourth polarized light beam by 90 degrees;
   a step of third polarization rotation, which rotates the polarizations of the third polarized light beam and the fourth polarized light beam by 90 degrees;
   a step of polarization combination, which combines the first polarized light beam and the second polarized light beam into the first output light beam and combines the third polarized light beam and the fourth polarized light beam into the second output light beam.

14. The method of claim 13, wherein the step of first polarization separation is accomplished using a birefringent crystal.

15. The method of claim 13, wherein the step of first polarization rotation is accomplished using a half-wave plate.

16. The method of claim 13, wherein the step of first polarization rotation is accomplished using a Faraday crystal.

17. The method of claim 13, wherein the step of AO filtering is accomplished using an AO crystal.

18. The method of claim 17, wherein the AO crystal is $TeO_2$.

19. The method of claim 13, wherein the step of second polarization separation is accomplished using a birefringent crystal.

20. The method of claim 13, wherein the step of second polarization rotation is accomplished using a half-wave plate.

21. The method of claim 13, wherein the step of second polarization rotation is accomplished using a Faraday crystal.

22. The method of claim 13, wherein the step of third polarization rotation is accomplished using a half-wave plate.

23. The method of claim 13, wherein the step of third polarization rotation is accomplished using a Faraday crystal.

24. The method of claim 13, wherein the step of polarization combination is accomplished using a birefringent crystal.

* * * * *